Aug. 1, 1961    J. E. BUSKIRK ET AL    2,994,731
VENT PLUG
Filed Dec. 28, 1959
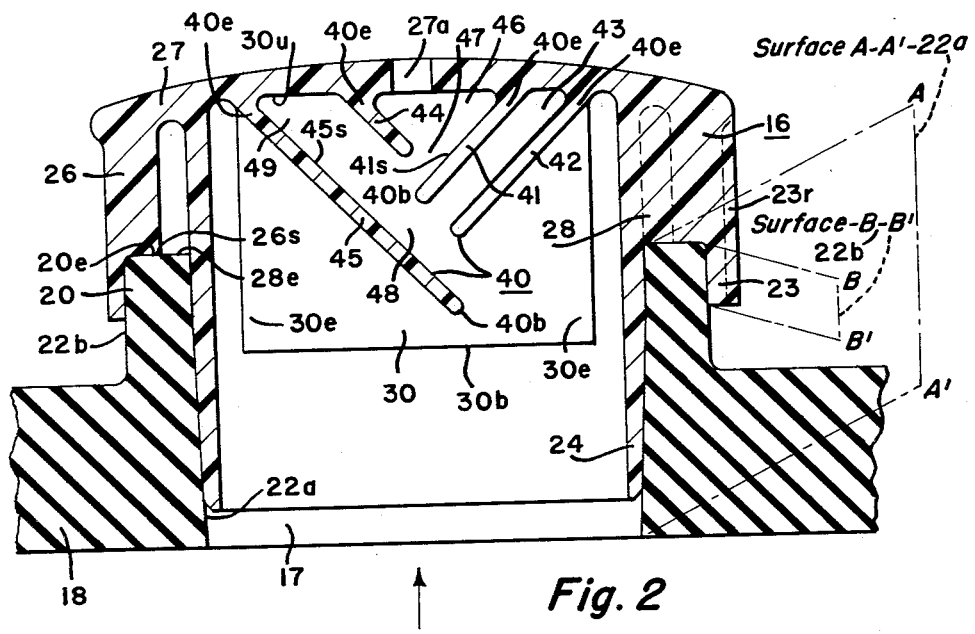
Fig. 2
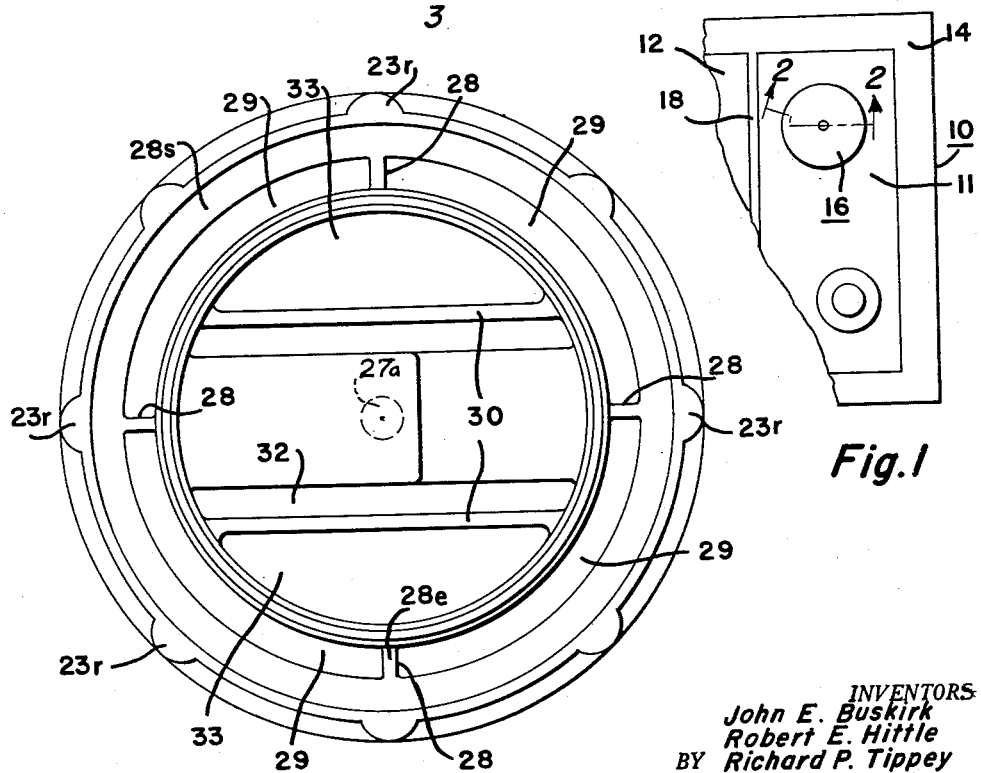
Fig. 3
Fig. 1
INVENTORS
John E. Buskirk
Robert E. Hittle
BY Richard P. Tippey
Their Attorney

2,994,731
VENT PLUG

John E. Buskirk, Muncie, Robert E. Hittle, Anderson, and Richard P. Tippey, Muncie, Ind., assignors to General Motors Corporation, Detroit, Mich., a corporation of Delaware
Filed Dec. 28, 1959, Ser. No. 862,367
7 Claims. (Cl. 136—163)

This invention relates to vent plugs or caps for storage battery cells, and more particularly, to internal baffling provided on battery vent plugs.

An object of this invention is to provide a new and improved baffle structure for a battery vent plug inexpensive to produce though effective to keep spray of fluid such as electrolyte to a minimum.

Another object of this invention is to provide an internal multi-directional baffle means integral with a unitary vent plug body of plastic material adapted to engage a filler opening portion of a battery cell cover so as to shield a single centrally-located vent passage and simultaneously provide drain-off surfaces located substantially transversely relative to each other for return of fluid such as electrolyte to the cell.

Still a further object of this invention is to provide a semi-rigid plastic battery vent cap having a dual and concentric skirt portion adapted to engage and seal relative to a battery cell opening surface while rigidity of an inner skirt portion is doubly enhanced by a pair of substantially parallel wall portions transverse thereto for backing of the inner skirt portion and forming a central chamber therebetween which is further divided into at least one additional space set off in part by a plurality of tongue means angular in location relative to each other and integral with the semi-rigid plastic vent cap though extending transversely relative to the pair of substantially parallel wall portions.

Another object of this invention is to provide a unitary battery vent plug body of semi-rigid plastic such as polyethylene and the like having a dual and concentric skirt portion with opposite annular surfaces differing in area to engage and seal relative to a battery filler-opening neck that abuts against an annular ledge as well as radial web means to serve as limit stops while the inner concentric skirt portion is reinforced laterally and internally by an integral inner transverse wall means forming plural cavity sections at least dead-end in part and one of which provides access to a vent passage and opening guarded by the transverse wall means in combination with dual pairs of tongue means integral at one end thereof with the plug body yet terminating in spaced and transverse relation to each other and the wall means so as to provide collectively an effective baffle for control of venting and splashing of fluid such as electrolyte.

Further objects and advantages of the present invention will be apparent from the following description, reference being had to the accompanying drawings wherein preferred embodiments of the present invention are clearly shown.

In the drawings:

FIGURE 1 is a fragmentary plan view of a battery equipped with a vent plug in accordance with the present invention.

FIGURE 2 is a cross-sectioned elevational view taken along line 2—2 in FIGURE 1.

FIGURE 3 is an end view of a vent plug taken in the direction of arrow 3 in FIGURE 2.

Vent plugs, sometimes called vent caps, as provided for storage battery cells are adapted to permit relief of excess pressure of gases which must be emitted from the cell and to permit testing and filling of the battery with liquid, such as acid, water, or both. FIGURE 1 illustrates a storage battery generally indicated by numeral 10 and including a series of cells 11 and 12 electrically connected and contained in a casing 14 of acid-resistant material such as hard rubber and the like having a different coefficient of expansion than semi-rigid plastic material used for vent caps generally indicated by numeral 16. Each vent plug can be molded of any suitable acid-resistant plastic material. For example, it can be made of polyethylene, colored if desired, as well as polystyrene and the like or other synthetic resilient plastic material that is acid-resistant and does not age harden appreciably and can be snap fitted or forced into a filler hole opening 17 of a cell cover 18 to seal the cell against spilling or leaking of electrolyte along surfaces of a vent well or neck 20 shown in FIGURE 2.

The vent well 20 is formed of acid-resistant material such as hard rubber and the like integral with cover 18 and having a coefficient of expansion like that of casing 14 but differing from the coefficient of expansion of the material used for the vent cap or plug 16. The neck or well includes an inside top well surface 22a and an outside top well surface 22b extending concentrically relative to each other for sealing engagement relative to complementary cylindrical surfaces A—A' and B—B' of outer skirt 23 and inner skirt 24 respectively with differing areas as disclosed in U.S. Patent 2,896,007 Buskirk issued July 21, 1959, and belonging to the assignee of the present invention. Structure of the vent plug of the present invention represents improvements in internal baffling necessary to keep acid spray to a minimum. The battery vent plug of the present invention is a unitary structure that can be made in a single molding operation without two-piece molding construction which would require assembly of pieces as necessary for structure of Patent 2,896,007 as well as for the vent plug of U.S. Patent 2,835,720-Buskirk issued May 20, 1958, and also belonging to the assignee of the present invention. The construction of the present invention eliminates a separate horizontal baffle with a hole in the center at the bottom of the plug and enables use of a one-piece, push-on type construction at a considerable savings in cost and material.

Difference in surface sealing areas relative to well surfaces 22a and 22b can be advantageously used without need for progressive threading in the cell cover and vent cap. Annular skirt portion or downwardly extending lower body section 26 is integral with a top cover or inverted dish-shaped upper body portion 27 as well as web means 28 visible in FIGURES 2 and 3. Two or more webs 28 are provided extending laterally or radially outwardly between inner skirt portion 24 and lower body section 26 joined to outer skirt 23. As best seen in FIGURE 3, there are four webs 28 that divide an annular space between lower body section 26 and inner skirt 24 into recess quadrants 29 which, in effect, are cut-outs or voids that enhance resilience of the inner skirt portion 24 relative to the outer skirt 23 and lower body section 26. The webs 28 are laterally or radially flexible to a limited extent. The lower body section 26 provides an annular ledge or shelf 26s in a surface coplanar with a lower edge 28e of the webs 28 engageable against a top edge 20e of the neck or wall well portion 20. The shelf 26s and edges 28e serve as limit stops for a tight, sliding, and positive seal obtained as the vent cap or plug of the present invention is snapped into place to stay in position under many and all operating conditions free of loosening and/or loss of screw-type vent caps where acid spray leaking out of the filler opening 17 could cause corrosion of vehicle compartments surrounding the battery. The webs 28 protect against excessive separation of skirt portions 23 and 24 laterally away from each other and, further, in accordance with the present invention, there is enhancement doubly of rigidity of the inner annular skirt portion 24 by a pair of substantially parallel and vertically extending wall portions 30 visible in FIGURES 2 and 3.

Opposite ends or edges 30e are integral with and intersect the inner periphery of inner skirt 24 so as to provide a box-like backing of the inner skirt portion and so as to form a central chamber 32 therebetween. Each upper edge 30u of each wall portion 30 is integral with a lower periphery of the upper body portion 27 so as to form laterally separated semi-annular chambers 33 on opposite sides of the wall portions 30. These semi-annular end chambers 33 are separated from the central chamber 32 by the wall portions 30 and form dead-end space effective for baffling passage of vapor and splashed fluid laterally into the central chamber 32. These semi-annular spaces 33 can be referred to as outer pockets and part of the improved internal baffling for a vent plug in accordance with the present invention.

The upper body portion 27 has a single centrally located aperture 27a extending vertically therethrough as a venting passage. Plural tongue means generally indicated by numeral 40 are provided integral with the upper body portion 27 along ends 40e remote from bottom transverse edges 40b. The tongue means 40 are substantially transverse in location relative to wall portions 30 and the bottom edges 40b are relatively unencumbered to permit limited up and down movement in accordance with resilience and flexibility of the plastic material used to make the unitary vent plug in accordance with the present invention. Lower edges 40b of a first pair of substantially parallel wall or tongue projections 41 and 42 are located substantially coplanar and laterally adjacent to each other. The tongue projections 41 and 42 form a semi-dead-end cavity 43 therebetween but laterally open relatively to the central chamber 32. Third and fourth wall projections 44 and 45 respectively are also substantially parallel to each other but transverse in direction relative to the first and second wall projections 41 and 42 respectively. The third wall projection 44 is the shortest of the dual pairs of tongue means and together with the first wall projection 41 forms a triangular-shaped space 46 adapted to provide communication between aperture 27a relative to a restriction 47 and passage 48 formed by the tongue projections of the dual pairs relative to each other. The passage 48 is formed to one side of a drain-off surface 45s of projection 45 and communicates with the cover opening 17 of the battery cell. The restriction 47 is located between bottom edge 40b of third projection 44 and adjacent to a drain-off surface 41s of the first projection 41. The third and fourth projections 44 and 45 respectively form another quasi dead-end space 49 therebetween laterally open with respect to central chamber 32. Only the triangular-shaped chamber 46 provides vertical access to vent aperture 27a and the wall portions 30 as well as the tongue means 40 collectively provide an effective baffle for control of venting and splashing of fluid such as electrolyte.

It is to be noted that the tongue projections 41, 42, 44 and 45 are integral at only one end with the vent plug body and extend at an angle of substantially 45° relative to the upper body portion thereof. The first pair of projections 41 and 42 are located to extend substantially at right angles relative to projections 44 and 45 of the second pair of tongue means. Each of the projections of the tongue means terminates in bottom edges which are in spaced relationship to each other. The bottom edges 40b of the projections extend substantially horizontally yet are located above a bottom edge 30b of each of the wall portions 30. The bottom edge 30b of each of the wall portions 30 is located substantially below a bottom annular periphery of the outer skirt 23 yet above a bottom annular periphery of the inner skirt 24.

To facilitate fitting of the vent plug 16 relative to a neck or well 20 of a battery, the outer skirt is provided with a plurality of laterally or radially outwardly extending vertical ribs 23r visible in FIGURES 2 and 3.

While the embodiments of the present invention as herein disclosed constitute preferred forms, it is to be understood that other forms might be adopted.

What is claimed is as follows:

1. For a snug-fitting threadless vent plug having a body of semi-rigid plastic material with a vent aperture in an upper portion and a lower portion including a pair of concentric inner and outer skirts, the improvement which comprises a pair of substantially parallel transversely-extending reinforcing wall portions integral along opposite ends with the inner skirt as a positive backing therefor and as baffle-chamber forming structure that further includes a first pair of flexible tongue projections integral only with the body at one end and terminating in free edges adjacent to each other, each of said tongue projections having a location intermediate and transverse to said wall portions though lataerally spaced a predetermined distance to one side of each of said wall portions, said first pair of projections defining a partial dead-end space therebetween, and a second pair of tongue projections extending also immediately adjacent to each other in a direction to intersect direction of said first pair of tongue projections and also defining a partial dead-end space therebetween, said second pair of projections also having lateral spacing from each of said wall portions, one of said second pair of projections being considerably shorter than the other and defining a restriction in passage to the vent aperture relative to one of said projections of said first pair, said longer one of said second pair of projections extending beyond and below terminating edges of said first pair of projections and forming a passage relative thereto.

2. A vent plug for use in a storage battery cell cover opening, comprising, a body of semi-rigid plastic material including an upper portion with a vent aperture therein and a lower portion integral with a pair of concentric inner and outer skirts, a pair of substantially parallel transversely-extending wall portions integral along opposite ends with the inner skirt and forming a central chamber therebetween, and plural tongue means extending flexibly from said upper portion into the central chamber though spaced laterally from both said wall portions and transverse relative to said wall portions so as to subdivide the central chamber into cavity sections of space at least dead-end in part and one of which provides access to the vent aperture.

3. The vent plug of claim 2 wherein said tongue means include dual pairs of projections integral and adjacent to each other at one end with said upper body portion and located substantially longitudinally in alignment with each other in staggered relation.

4. The vent plug of claim 2 wherein said body includes a lower portion having an annular shelf and plural laterally-extending webs integral radially between the inner and outer skirts, said webs serving positively to separate an annular space for resilience between said skirts and to protect against excessive separation of the skirts, said shelf as well as lower edges of said webs providing a limit stop means for fitting the vent plug relative to the cell cover opening.

5. A snug-fitting threadless vent plug for use in sealing peripherally about an annular well opening of a battery cell, comprising, a body of semi-rigid plastic material including an upper portion with a vent aperture therein and a lower annular portion integral with a pair of concentric inner and outer skirts, a pair of substantially parallel transversely-extending substantially rigid wall portions integral along opposite ends with said inner skirt as a positive lateral backing therefor and as part of baffle-chamber forming structure that further includes a first pair of flexible tongue projections integral only with said body at one end and terminating in free edges adjacent to each other, said first pair of projections defining a partial dead-end space therebetween, and a second pair of tongue projections extending also immediately adjacent to each other in a direction to intersect direction of said first pair of tongue projections and also defining a partial dead-end space therebetween, one of said second pair of projections being considerably shorter than the other and defining a restriction in passage to the vent aperture relative to one of said projections of said first pair, said longer one of said second pair of projections extending beyond and below terminating edges of said first pair of projections and forming a passage relative thereto.

6. The vent plug of claim 5 wherein said pairs of projections extend substantially at an angle of 45° relative to said upper portion and in pairs extend to intersect each other substantially at right angles.

7. The vent plug of claim 5 wherein said projections each terminate in edges above a bottom edge of said wall portions, said bottom edges of said wall portions having a location intermediate termination of lower annular peripheries of said inner and outer skirts.

References Cited in the file of this patent

UNITED STATES PATENTS

| | | |
|---|---|---|
| 1,605,820 | Edwards | Nov. 2, 1926 |
| 2,658,100 | Kendall | Nov. 3, 1953 |
| 2,896,007 | Buskirk | July 21, 1959 |

FOREIGN PATENTS

| | | |
|---|---|---|
| 328,756 | Great Britain | May 8, 1930 |